United States Patent
Lechthaler et al.

[11] Patent Number: 5,840,359
[45] Date of Patent: Nov. 24, 1998

[54] PROCESS AND APPARATUS FOR MANUFACTURING NOODLES

[75] Inventors: Jurg Lechthaler, Wallisellen, Switzerland; Shiok Guat Teh, Singapore, Singapore; Luca Rusconi, Pasay, Philippines; Philipp Paul Meyer, Benglen; Othman Mohamad Yusoff, La Tour-de-Peilz, both of Switzerland

[73] Assignee: Nestec S.A., Vevey, Switzerland

[21] Appl. No.: 849,813

[22] PCT Filed: Oct. 27, 1995

[86] PCT No.: PCT/CH95/00251

§ 371 Date: Sep. 17, 1997

§ 102(e) Date: Sep. 17, 1997

[87] PCT Pub. No.: WO97/16070

PCT Pub. Date: May 9, 1997

[51] Int. Cl.[6] .................................. A21C 11/00; A23P 1/00
[52] U.S. Cl. .......................... 426/516; 99/353; 425/204; 425/296; 425/327; 426/502; 426/557
[58] Field of Search ..................... 426/496, 502, 426/504, 516, 557; 425/204, 327, 296; 264/176.1, 211.21; 99/353

[56] References Cited

U.S. PATENT DOCUMENTS

| | | | |
|---|---|---|---|
| 4,121,301 | 10/1978 | De Francisci | 99/353 |
| 4,540,592 | 9/1985 | Myer et al. | 426/516 |
| 4,675,199 | 6/1987 | Hsu | 426/557 |
| 5,139,806 | 8/1992 | Hauser et al. | 426/496 |
| 5,198,261 | 3/1993 | Sasaki et al. | 426/643 |
| 5,366,680 | 11/1994 | Foresman | 426/516 |

FOREIGN PATENT DOCUMENTS

| | | |
|---|---|---|
| 0 086 246 A1 | 8/1983 | European Pat. Off. . |
| 0 203 321 A1 | 12/1986 | European Pat. Off. . |
| 0 398 315 A2 | 11/1990 | European Pat. Off. . |
| 0 471 103 A1 | 2/1992 | European Pat. Off. . |
| 0 682 875 A1 | 11/1995 | European Pat. Off. . |
| 2042424 | 10/1980 | United Kingdom . |

*Primary Examiner*—George Yeung
*Attorney, Agent, or Firm*—Pennie & Edmonds LLP

[57] ABSTRACT

Process and apparatus for the manufacture of noodles, in which a mixture of cereal semolina or flour and water is prepared in a twin-screw kneader, the mixture is converted into a band of pasta by pressing it through a die with an oblong outlet orifice, the band is laminated and it is cut into noodles.

20 Claims, 5 Drawing Sheets

PROCESS AND APPARATUS FOR MANUFACTURING NOODLES

TECHNICAL FIELD

The subject of the present invention is a process for the manufacture. of noodles in which a mixture of flour or cereal and water is prepared having a water content of 25–40%, the mixture is converted to a. band of pasta, the band is laminated and then cut into noodles, as well as an apparatus for carrying out this process.

BACKGROUND ART

U.S. Pat. No. 5,211,965 (KK TAKASHIN) describes an apparatus for the manufacture of a base for noodles comprising a cylindrical device with a screw conveyor having, at one end, an inlet for supplying the raw materials of the noodle base and, at another end, an extrusion die having a rectangular outlet orifice whose width is adjustable, so as to be able to adjust the pressure to which the mixture of raw materials pushed through the orifice by the screw conveyor is subjected, and thereby to be able to adjust the throughput and/or the firmness of the base for noodles thus extruded in the form of a thick band.

Moreover, traditional lines marketed by companies such as Ohtake, Fuji or Tokyo Menki for the industrial manufacture of oriental noodles may comprise successive devices for mixing the components, converting the mixture into a band of pasta, laminating the band, cutting, treating with steam, forming into a coil, drying, cooling and packaging, the mixing device itself generally comprising two horizontal or vertical paddle mixers mounted in parallel, the components being mixed in loads alternately in one or other mixer.

SUMMARY OF THE INVENTION

The aim of the present invention is to propose a process for the manufacture of noodles and an apparatus for its implementation which are simple and which subject the said mixture of cereal semolina or flour and water to only low shearing.

To this end, the process for the manufacture of noodles according to the present invention, in which a mixture of cereal semolina or flour and water is prepared having a water content of 25–40%, the mixture is converted to a band of pasta, the band is laminated and it is cut into noodles, differs in that the mixture is prepared in a twin-screw kneader at a relative pressure of 0–1000 kPa and it is converted to a band of pasta by then pressing it through a die with an oblong outlet orifice.

Likewise, the apparatus for carrying out the process according to the present invention comprises a twin-screw kneader, a die with an oblong outlet orifice, a laminating device and a cutting device.

It has been observed, surprisingly, that it is indeed possible to manufacture noodles having organoleptic qualities at least comparable to those of noodles, especially oriental noodles, manufactured by a traditional process, although the process and the apparatus for carrying it out are comparatively

BRIEF DESCRIPTION OF THE DRAWINGS

The apparatus according to the present invention is described in greater detail below with reference to the accompanying drawings in which.

DETAILED DESCRIPTION OF THE PREFERRED EMBODIMENTS

Figure 1:
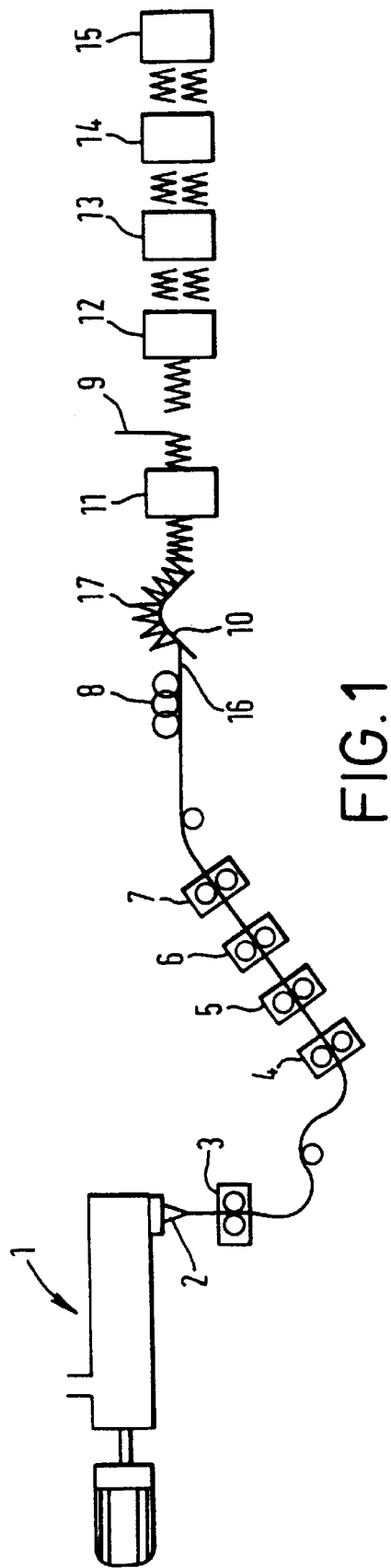
FIG. 1 is an overall schematic representation of one embodiment of the invention.

In the present text, the term "noodles" used as such denotes in the general sense any pasta or noodles based on cereal semolina or flour having the shape of a relatively thin band with a section which is generally rectangular or curved in the form of a semi-tube.

The expression "western noodles" denotes pastas having such a shape, which are generally prepared from hard wheat semolina and water, and which can be expected to have a crisp texture under the teeth, in other words an "al dente" texture, after cooking in salt water for a sufficient period.

The expression "oriental noodles" denotes pastas having such a shape, which are generally prepared from soft wheat flour and kansui, and which can be expected to have an elastic texture under the teeth after relatively brief cooking in a sufficient quantity of water with which they are intended to be consumed.

The term "kansui" denotes an aqueous alkaline solution, namely water in which is dissolved a composition of salts comprising especially NaCl, carboxymethylcellulose (CMC), $K_2CO_3$, $Na_2CO_3$ and/or Na polyphosphate for example. These salts are intended to exert a stabilizing effect on the elastic texture of the oriental noodles during their traditional consumption with their cooking water.

To carry out the present process, a wheat semolina or flour is preferably used, supplemented or otherwise with ingredients such as egg yolk or spices for example. It is possible to use in particular a hard wheat semolina having a particle size of 250–350 μm to manufacture western noodles, or a soft wheat flour having a particle size of 50–150 μm to prepare oriental noodles.

Provision may be made, where necessary, for a premixing and prewetting stage, especially in a rapid paddle mixer which delivers a premix in the form of moistened flour or semolina lumps, such a step making it possible to save on in particular the useful free space in the mixer.

The semolina or flour is therefore mixed with a quantity of water such that the mixture obtained has a water content of 25–40%, preferably 30–35% by weight.

To manufacture western noodles, hard wheat semolina may be mixed with water.

To manufacture oriental noodles, soft wheat flour may be mixed with kansui.

The kansui may comprise 2–10% NaCl, 0–1% CMC, 0.1–1% $K_2CO_3$ and/or $Na_2CO_3$ and 0–1% Na polyphosphate. A colouring such as beta-carotene for example may also be added thereto.

The mixture is therefore prepared in a twin-screw kneader under a relatively low pressure of 0–1000 kP. In fact, this relative pressure may even be maintained at the bottom of this range and not exceed 100 kPa.

The general drawing or the arrangement and/or the layout of the various elements which form the two screws of the kneader, especially mixing and/or kneading bilobes, may indeed, on the one hand, be provided such that the pressure and shearing stresses exerted on the mixture are minimized and, on the other hand, be adapted to the raw materials and to the desired product.

The residence time of the mixture in the kneader may be 20–60 s, it being possible for the two screws to rotate at a speed of between 40 and 120 revolutions per min (rpm).

Provision may be made to degas the mixture before it leaves the kneader. It may be degassed in particular by aspiration by a vacuum of less than an absolute pressure of 50 kPa, preferably less than or equal to an absolute pressure of 20 kPa. Such a degassing is particularly recommended in the case of a manufacture of dehydrated western noodles since it makes it possible to avoid a problem of cracking and the appearance of white spots at the surface of the noodles.

In a preferred embodiment of the present process, the mixture is pressed through a die under the effect of the pressure exerted by the twin-screw kneader.

In a specific embodiment of the present process, provision is made to press the mixture through the die with the aid of a gear pump connected between the kneader and the die.

It has indeed also been observed, surprisingly, that in spite of the fact that the mixture thus passes through a gear pump and that it is briefly subjected to severe stresses which it might be feared would damage it, this specific embodiment of the present process also makes it possible to manufacture noodles having organoleptic qualities comparable to those of noodles manufactured by a traditional process.

Indeed, between the teeth of a gear pump comprising two toothed wheels or rollers which mesh into each other, the mixture may be subjected to a compression of several MPa values. If the mixture is not thereby damaged, this may be due to the fact that it is subjected to this compression for only a very short time of the order of a fraction of a second without being subjected to any shearing.

In this specific embodiment of the present process, the relative pressure exerted by the pump on the mixture may be between more than 1000 kP and 12,000 kP, preferably between 5000 kP and 12,000 kP.

The mixture is therefore converted to a band of pasta by pressing it through a die with an oblong outlet orifice. This outlet orifice is preferably rectangular and may be provided in a vertical or horizontal plane, the long side of the rectangle being respectively horizontal or transverse.

In the preferred embodiment of the process where the mixture is pressed through the die under the effect of the pressure exerted by the twin-screw kneader, the dimensions of the outlet orifice of the die may be such that the relative pressure in the kneader may be maintained at the relatively low value desired. Provision can thus be made for a width of the outlet orifice, in particular a length of the short side of the rectangle of between 8 mm and 20 mm, and a length of the outlet orifice, in particular a length of the long side of the rectangle of between 50 mm and 200 mm.

In the specific embodiment of the present process where the mixture is pressed through the die with the aid of a gear pump connected between the kneader and the die, provision may be made for a width of the outlet orifice, in particular a length of the short side of the rectangle of between 1.5 mm and 10 mm, and a length of the outlet orifice, in particular a length of the long side of the rectangle of between 50 mm and 200 mm.

The band leaving the die may be laminated by passing it through a pair or a succession of pairs of rollers, especially a succession of two to five pairs of rollers of decreasing gap, starting with a first gap of 2–20 mm, ending with a final gap of 0.6–1.5 mm.

Once the band has been laminated, it can be cut lengthwise, into strips of 1–10 mm for western noodles or 1–3 mm in width for oriental noodles.

In the case where western noodles are manufactured, these 1–10 mm wide strips or noodles may be cut at right angles to the desired length. They may then be packaged as they are, as fresh pastas or after having been dried in a traditional hot air dryer with controlled humidity.

In the case where oriental noodles are manufactured, these 1–3 mm wide strips or noodles may be treated with steam, shaped into coils and dried, especially with hot air or by deep-frying.

To carry out this steam treatment and this forming into a coil, each strip or noodle may be converted to a continuous stream of transverse loops by causing it to hit a suitable brake. These streams may be treated with steam at atmospheric pressure at 95°–100° C. for 1–3 min and they can be cut transversely into pieces whose length is equal to twice their width. The pieces can then be folded into two so as to obtain a square coil of noodles.

These coils of oriental noodles may be dried with hot air at 65°–95° C. for 30–60 min, or by deepfrying them at 120°–160° C. for 30 s to 2 min.

In the latter case, each coil may be laced in a square-shaped tub which is immersed in an oil bath heated to the desired temperatures, this oil being preferably an oil resistant to heat, especially palm or groundnut oil.

The coils may then be cooled with cold air, especially with the aid of a stream or blast of cold air sufficiently strong to detach and carry, in the form of droplets, at least a portion of the oil remaining at the surface of the fried noodles.

The deep-frying may also be preceded by a brief immersion of the coils in cold water, especially for 1-5 s, in order to avoid possible problems of sticking of the noodles.

The apparatus for implementing the process according to the present invention therefore comprises a twin-screw kneader, a die with an oblong outlet orifice, a laminating device and a cutting device.

The twin-screw mixer may comprise two screws rotating in the same direction and meshing with each other.

The two screws may have, alternately and/or in succession, mixing, kneading and/or holding zones for example. These zones may be appropriately formed by varying the length and the direction of the screw pitch, or even the shape of the screws in these zones.

The two screws may comprise in particular two parallel shafts rotating in the same direction and onto which are slipped and fixed against each other bilobes, each having the shape of a screw section whose thickness may be less than, equal to or greater than the screw pitch. The length and the direction of the screw pitch associated with a bilobe, as well as the respective angular positions of two successive bilobes, may be chosen as a function of the type of work or operation which it is desired to carry out in the zone considered.

To form a mixing zone, bilobes with a positive pitch can be used. To form a kneading zone, bilobes with no pitch may be used. To form a mixed zone for mixing and kneading, successive bilobes with positive pitches which are angularly spaced apart may be used. Finally, to form a holding zone, bilobes with a negative pitch may be used.

The shape of the bilobes of a twin-screw kneader viewed in the direction of the axis of the screws may differ from the corresponding shape of the bilobes of a twin-screw extruder, by way of comparison, by a smaller width which, on the one hand, leaves more free space available for the material to be treated and which, on the other hand, leaves a more open angle of contact between a summit of the bilobe and the inner wall of the casing against which it rotates. The consequence of this bigger free space and this more open angle of contact is in particular to minimize the shearing exerted on the material treated.

This smaller width of the bilobes may also be associated with a smaller diameter of the axes as well as a smaller screw length/diameter ratio, especially a ratio of between 7 and 10 for a twin-screw kneader compared with a ratio of between 20 and 30 for a twin-screw extruder.

Both screws may be enclosed in a jacketed barrel, especially a jacketed barrel subdivided into compartments in which a cooling or heating fluid may be. circulated. This barrel may have at an upstream end one or more inlets for supplying the screws with components to be mixed and, at a downstream end, a possible connection for vacuum aspiration and an outlet for the mixture.

In a preferred embodiment of the present apparatus, the outlet of the kneader leads directly to the die.

The die therefore has an oblong, preferably rectangular, outlet orifice which may be provided in a vertical or horizontal plane, the long side of the rectangle being respectively horizontal or transverse.

In a specific embodiment of the present apparatus, a gear pump is provided between the outlet of the kneader and the die.

The gear pump may comprise two toothed wheels, or toothed rollers, which mesh with each other. Both rollers may rotate in a housing around axes situated in a plane perpendicular to the direction of a current of the mixture to be converted into a band coming from the kneader. They may each rotate in an opposite direction, the teeth coming apart upstream and coming together downstream. The outer edge of the teeth can slide against a corresponding inner wall of the housing, thus defining interstitial spaces intended for the transport of the mixture to be converted into a band downstream.

The shape of the teeth may be specially designed to avoid as much as possible any friction between the teeth which mesh and any shearing on the mixture transported.

The die and the possible gear pump may be enclosed in a jacketed casing subdivided into compartments in which a cooling or heating fluid may be circulated.

The laminating device may comprise a pair or a succession of pairs of rollers, especially a succession of two to five pairs of rollers of decreasing gap. A first pair of rollers may have a relatively large gap, corresponding to the width of the outlet orifice of the die, in order to be able to take control of the forward movement of the band. A last pair of rollers may have a gap corresponding to the desired final thickness of the noodles.

The cutting device may comprise longitudinal cutting means, especially rotating discs provided after the last pair of rollers, and transverse cutting means, especially blades for example.

If it is intended for the manufacture of oriental noodles, the present apparatus may comprise a braking device provided after the longitudinal cutting means and comprising especially a stop against which the individual noodles or strips are forced to form transverse undulations or loops which form a continuous stream by being squeezed one behind the other.

A device for treating these streams of loops with steam may be provided after the braking device and before the transverse cutting means.

After the transverse cutting means, a folding device may be provided followed by a drying device.

The latter may be produced in the form of a hot-air drying tunnel or in the form of a deep-frying device.

In the latter case, provision is preferably made for a device for immersing in cold water and a device for blowing oil respectively before and after the deep-frying device.

As regards the advantages of the present process and of the present apparatus for implementing it, it was noted above that, surprisingly, they indeed make it possible to manufacture noodles having organoleptic qualities completely comparable to those of noodles, especially oriental noodles, manufactured by a traditional process and apparatus, although the present process and the present apparatus are comparatively simpler.

To this there may be added that it has also been observed, surprisingly, that the present process, preferably comprising the steps of immersing in cold water and of blowing oil described above, can also make it possible to reduce substantially the quantity of oil absorbed by oriental noodles compared with the quantity of oil which they absorb if they are manufactured by a traditional process and apparatus.

It is finally possible to note the fact that, compared with a manufacture of oriental noodles carried out with the aid of a traditional plant as described in the introduction of the present text, the present process and the present apparatus allow a continuous manufacture of oriental pasta which minimizes variations in the quality of the mixture, especially in its water content and in its elasticity, while considerably shortening the duration of the mixing step.

In the preferred embodiment represented in FIG. 1, the present apparatus comprises a twin-screw kneader 1, a die with a rectangular outlet orifice 2, a laminating device 3-7, a cutting device 8-9, a braking device 10, a device for treating with steam 11, a folding device 12, a device for immersing in cold water 13, a deep-frying device 14, and a device for blowing oil 15.

The laminating device comprises a succession of five pairs of rollers 3-7 with a decreasing gap. A first pair of rollers 3 has a relatively wide gap, corresponding to the width of the outlet orifice of the die, in order to be able to take control of the forward movement of the band. A last pair of rollers 7 has a gap corresponding to the desired final thickness of the noodles.

The cutting device comprises longitudinal cutting means, in this case rotating discs 8 provided after the last pair of rollers 7, and transverse cutting means, in this case blades 9 provided after the device for treating with steam 11.

The braking device provided after the longitudinal cutting means 8 comprises a stop 10 against which the individual strips or noodles 16 are forced to form transverse undulations or loops which form a continuous stream 17 by squeezing one behind the other.

The device for steam treatment 11 of these streams of loops 17 is provided after the braking device 10 and before the transverse cutting means 9.

Figure 2:
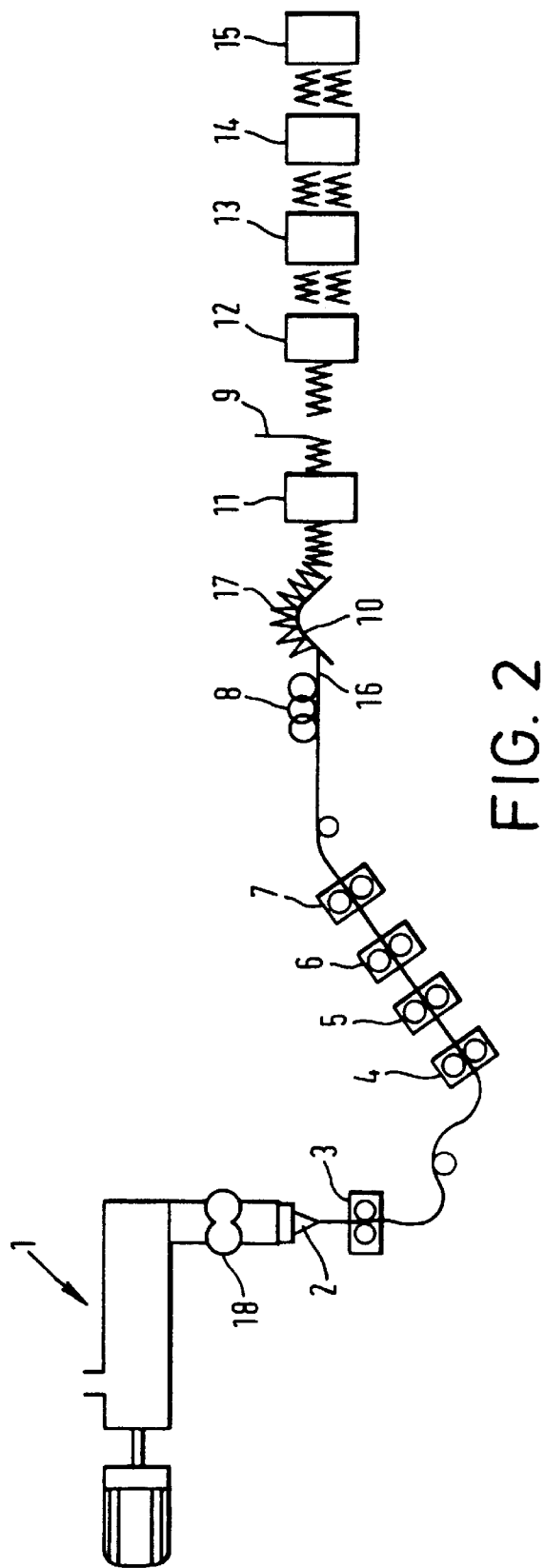
FIG. 2 is an overall schematic representation of another embodiment of the invention.

In the specific embodiment represented in FIG. 2, the present apparatus differs from the preferred embodiment represented in FIG. 1 only by the fact that a gear pump 18 is connected between the outlet of the kneader 1 and the die 2.

Figure 3:
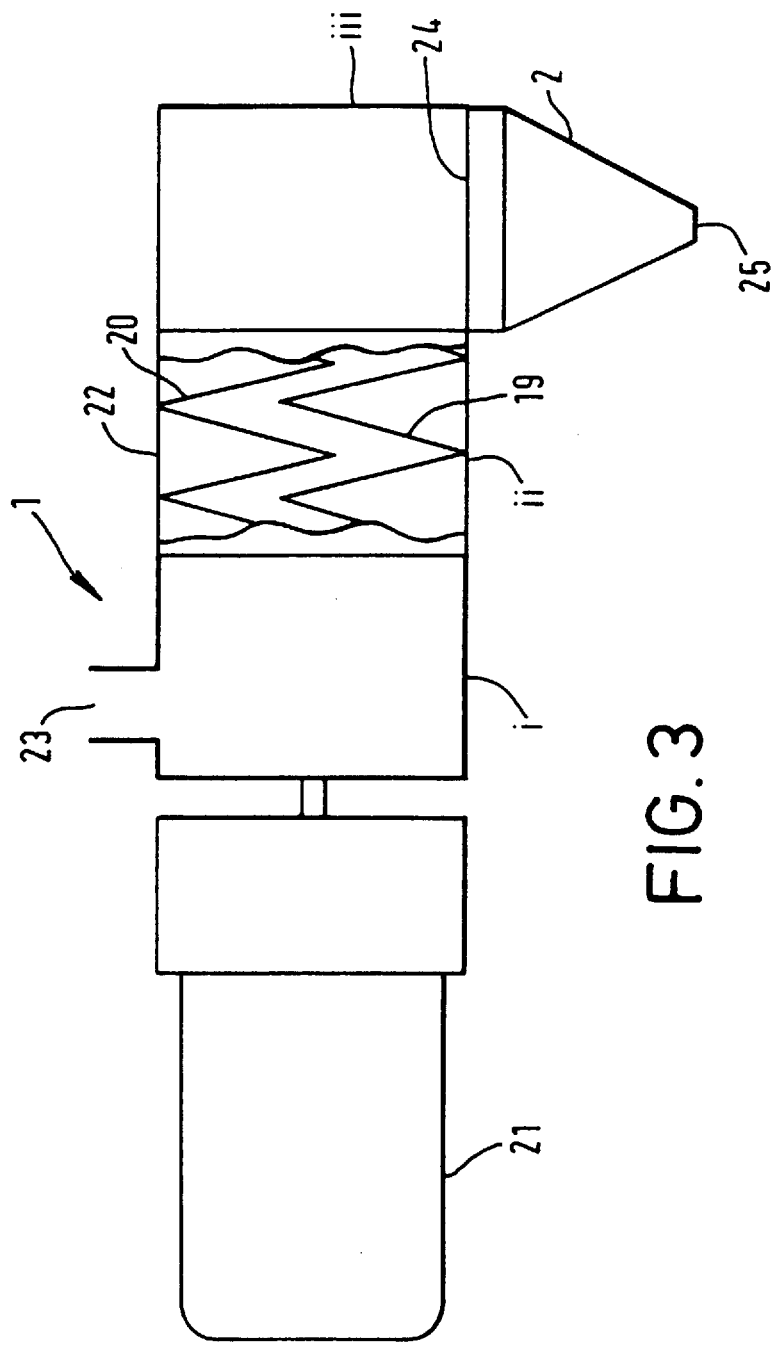
FIG. 3 is a side view, partially in cross-section of the kneader and die of FIG. 1.

As schematically represented in FIG. 3, the kneader 1 of the preferred embodiment of the apparatus represented in FIG. 1 comprises two screws 19 and 20 rotating in the same direction and meshing with each other. Both screws are driven by a motor 21.

The two screws 19 and 20 are enclosed in a jacketed barrel 22 subdivided into compartments i–iii in which a cooling or heating fluid may be circulated. The barrel 22 has at an upstream end an inlet 23 for supplying the screws with components to be mixed and at a downstream end an outlet 24 for the mixture which leads directly to the die 2.

The die 2 has a rectangular outlet orifice 25 provided in a horizontal plane, the long side of the rectangle being transverse.

Figure 4:
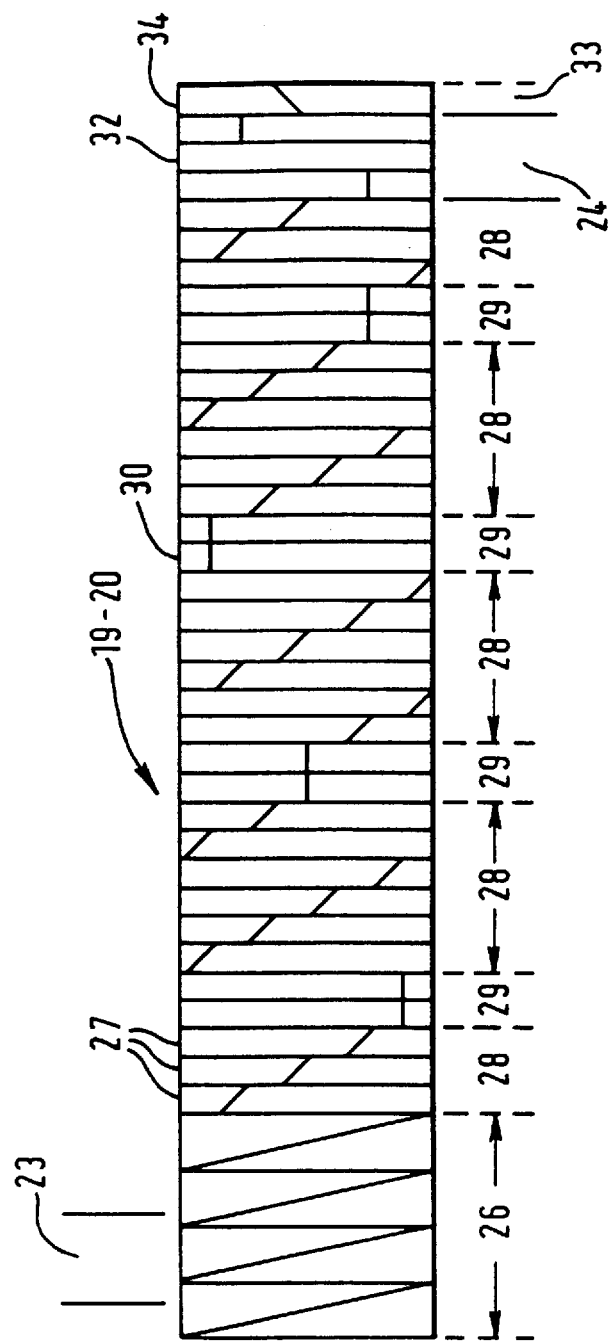
FIG. 4 is a schematic top view of the kneader of FIG. 1.

As seen in FIG. 4, the screws 19 and 20 of the kneader, only one of which is represented, have at their upstream end a mixing zone 26 consisting of few bilobes with a positive pitch. They then have alternately five mixed zones for mixing and kneading 28 each consisting of few bilobes 27 with positive pitches which are angularly spaced apart, and four kneading zones 29 each consisting of two bilobes with no pitch 30. They have, at their downstream end, an outlet zone corresponding to the outlet 24 and consisting of two bilobes with no pitch separated by a space 32. The outlet zone is followed downstream by a holding zone 33 consisting of a holding bilobe 34 with a negative pitch.

Figure 5:
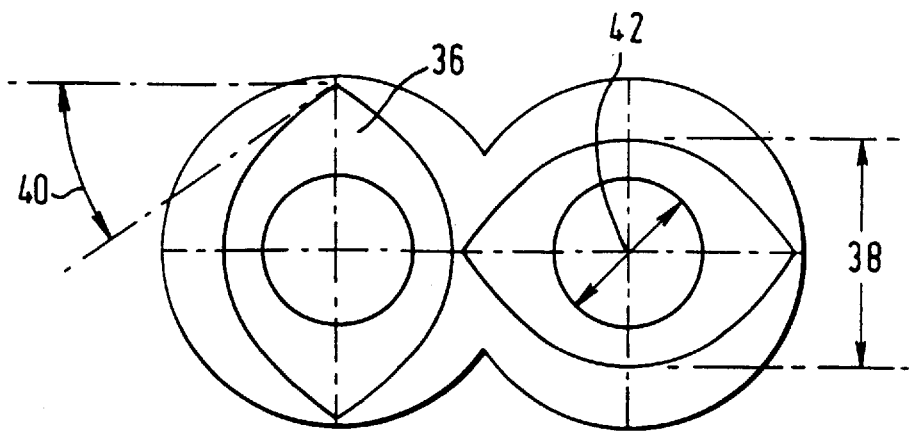
FIG. 5 is a cross-sectional view of an extruder for use in the invention.
Figure 6:
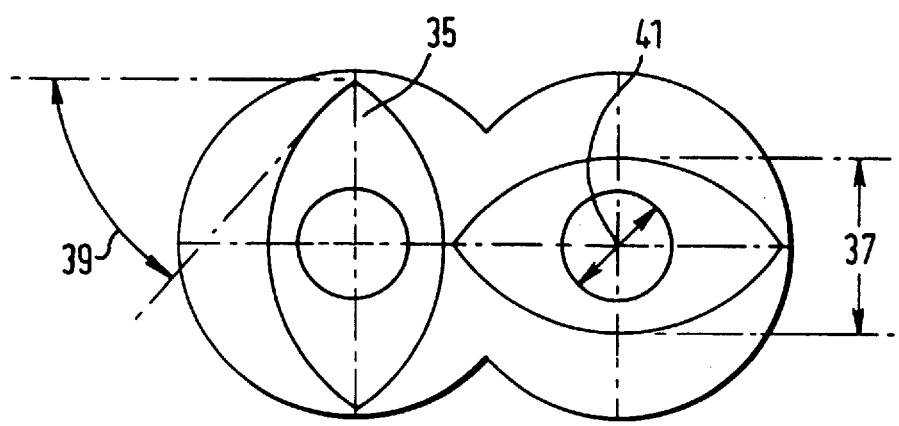
FIG. 6 is a cross-sectional view of the kneader of FIG. 1.

FIGS. 5 and 6 show that, viewed in the direction of the axis of the screws, the shape of the bilobes 35 of a twin-screw kneader can be distinguished from the corresponding shape of the bilobes 36 of a twin-screw extruder, by way of comparison. The width 37 of the bilobes of the kneader is less than the width 38 of the bilobes of an extruder, which leaves more free space available for the material to be treated.

Likewise, the angle of contact 39 between the summit of the bilobes 35 of the kneader and the inner wall of the casing against which it rotates is more open than the corresponding angle of contact 40 for the bilobes 36 of an extruder, which minimizes the shearing exerted on the material treated.

The fact that the kneader exerts only weak pressure and shearing stresses on the material to be treated also allows a lighter construction. Accordingly, the diameter 41 of the axes of the screws of the kneader may be considerably smaller than the diameter 42 of the axes of the screws of an extruder, which leaves even more free space available for the material to be treated.

EXAMPLES

The process according to the present invention is described in greater detail in the examples presented below by way of illustration. The percentages are given therein by weight.

Example 1

An apparatus corresponding to the preferred embodiment represented in FIG. 1 is used in which the kneader is a READCO-type TELEDYNE kneader comprising two screws 125 mm in diameter meshing with one another and rotating in the same direction, and having a total length of 1100 mm.

The die has a rectangular outlet orifice of 10 mm×100 mm.

The laminating device comprises a succession of four pairs of rollers with gaps which are successively 4, 2.5, 1.5 and 0.8 mm.

The kneader is fed with 730 kg/h of soft wheat flour having a particle size of 50–120 μm and with 235 kg/h of kansui having the following composition:

| | |
|---|---|
| Sodium chloride | 7.0% |
| CMC | 0.7% |
| $K_2CO_3$ | 0.26% |
| $Na_2CO_3$ | 0.17% |
| Na polyphosphate | 0.34% |
| Beta-carotene | 0.005% |
| Water | difference to 100% |

The speed of rotation of the kneader screw is adjusted to 80 rpm. The mixture is then subjected to a relative pressure of 600 kPa in the kneader where it stays for about 45 s.

The band leaving the die has a thickness of 16–18 mm. This is successively reduced to a thickness of 5, 3, 2 and 1 mm after passing through the pairs of laminating rollers.

It is then cut into strips 2 mm wide which are converted into continuous streams of transverse loops by arriving against the stop of the braking device.

These streams are treated with steam at atmospheric pressure at 98° C. for 80 s and then cut transversely into pieces with a length double their width which are then folded into two to form square coils of noodles.

The coils are immersed for 2 s in cold water and then deep-fried, in this case in palm oil at 135° C. for 70 s.

These coils are then cooled with the aid of a blast of cold air which carries away part of the oil remaining at the surface of the noodles.

Oriental noodles are thus obtained which have organoleptic qualities in all respects comparable to those of traditional oriental noodles.

The oriental noodles thus obtained have, in addition, the advantage of having absorbed a quantity of oil which is reduced by about 4–8% compared with the quantity of oil absorbed by oriental noodles as obtained by a traditional process and with the aid of a traditional apparatus as described in the introduction of the present text for example.

Example 2

The procedure is carried out as described in Example 1, with the exception of the fact that the kansui has the following composition:

| | |
|---|---|
| Sodium chloride | 4.8% |
| CMC | 0.48% |
| $K_2CO_3$ | 0.48% |
| $Na_2CO_3$ | 0.32% |
| Na polyphosphate | 0.15% |
| Beta-carotene | 0.005% |
| Water | difference to 100% |

The mixture is subjected to a relative pressure of 800 kPa in the kneader and the coils are deep-fried for 80 s.

Oriental noodles are thus obtained which have organoleptic qualities in all respects comparable to those of traditional oriental noodles.

The oriental noodles thus obtained have, in addition, the advantage of having absorbed a quantity of oil which is reduced by about 4–8% compared with the quantity of oil absorbed by oriental noodles as obtained by a traditional process and with the aid of a traditional apparatus as described in the introduction of the present text for example.

Example 3

An apparatus corresponding to the specific embodiment represented in FIG. 2 up to and including the laminating device is used in which the kneader is a READCO-type TELEDYNE kneader as described in Example 1, the kneader barrel has a connection for vacuum aspiration at its downstream end just before its outlet, and the gear pump is a VACOREX 90/90-type MAAG pump.

The die has a rectangular outlet orifice of 2 mm×100 mm.

The laminating device comprises a succession of four pairs of rollers with gaps which are successively 2.0, 1.5, 1.3 and 1 mm.

By circulating a heating fluid, a temperature of 48° C. is maintained in the kneader barrel.

The kneader is fed with 800 kg/h of hard wheat semolina having a particle size of 250–300 µm and with 200 kg/h of water.

The speed of rotation of the kneader screws is adjusted to 70 rpm. The mixture is then subjected to a relative pressure of 800 kPa in the kneader where it stays for about 45 s.

The mixture is degassed by aspiration with a vacuum equal to an absolute pressure of 20 kPa.

The speed of rotation of the toothed rollers of the gear pump is adjusted to 36 rpm. The relative pressure thus exerted by the pump on the mixture is 11,000 kPa.

The band leaving the die has a thickness of 34 mm. It is successively reduced to a thickness of 2.5, 1.6, 1.4 and 1.2 mm after passing through the pairs of laminating rollers.

The laminated band is cut lengthwise into strips 8 mm wide which are themselves cut transversely into noodles of few tenths of cm in length.

These western noodles are dried in a traditional hot-air dryer with controlled humidity.

Western noodles or tagliatelli are thus obtained which have an attractive yellow colour with no white spot and whose organoleptic qualities are comparable, or even superior to those of tagliatelli manufactured traditionally.

What is claimed is:

1. In a process for the manufacture of noodles, which comprises preparing a mixture of cereal semolina or flour and water, the mixture having a water content of 25–40%, converting the mixture into a band of pasta, and cutting the band into noodles, the improvement which comprises preparing the mixture in a twin-screw kneader at a relatively low pressure of no greater than 1000 kPa and converting the mixture into a band of pasta by passing the mixture through a die having an oblong outlet orifice.

2. The process according to claim 1, in which, to manufacture oriental noodles, a mixture of soft wheat flour and kansui is prepared, the soft wheat flour having a particle size of 50–150 µm.

3. The process according to claim 1, in which, to manufacture western noodles, a mixture of hard wheat semolina and water is prepared, the hard wheat semolina having a particle size of 250–350 µm.

4. The process according to claim 2, in which the kansui comprises 2–10% NaCl, 0–1% CMC, 0.1% of $K_2CO_3$ or $Na_2CO_3$ and 0–1% Na polyphosphate.

5. The process according to claim 1, which further comprises passing the mixture through the kneader with a residence time of 20–60 s.

6. The process according to claim 1, in which the mixture is passed through the die due to pressure exerted by the twin-screw kneader.

7. The process according to claim 1 which further comprises passing the mixture through the die using a gear pump connected between the kneader and the die.

8. The process according to claim 6, which further comprises providing the die with a rectangular outlet orifice of 8–20 mm by 50–200 mm.

9. The process according to claim 6, which further comprises providing the die with a rectangular outlet orifice of 1.5–10 mm by 50–22 mm.

10. The process according to claim 1, which further comprises laminating the band leaving the die before cutting by passing the band through a succession of two to five pairs of rollers of decreasing gap, starting with a first gap of 2–20 mm and ending with a final gap of 0.6–1.5 mm.

11. The process according to claim 2, in which the band is cut lengthwise into strips 1–3 mm wide, and which further comprises coiling the strips into coils, treating the coils with steam at atmospheric pressure and at 95°–100° C. for 1–3 min., immersing the coils in water for 1–5 s, frying the coils at 120°–160° C. for 30 s to 2 min and cooling the coils with air.

12. The process according to claim 3, in which the band is cut lengthwise into strips 1–10 mm wide.

13. The process according to claim 1, in which the kneader is a twin screw kneader having screws rotating in the same direction and meshing with each other.

14. The process according to claim 13, in which each screw of the kneader has a shaft provided with a plurality of bilobes to form successive mixing, kneading or holding zones.

15. The process according to claim 14, in which the screws are enclosed in a jacketed barrel which is subdivided into compartments for circulation of a heating or cooling fluid.

16. The process according to claim 7, in which the gear pump includes two toothed rollers or wheels which mesh together and rotate in a plane perpendicular to the direction of movement of the mixture, with the shape of the teeth being designed to avoid shearing of the mixture.

17. An apparatus for the manufacture of noodles comprising a twin-screw kneader for preparing a mixture of cereal semolina or flour and water, a die with an oblong outlet orifice for extruding the mixture into a band of pasta, a laminating device for imparting a final thickness for the band of pasta and a cutting device for cutting the band of pasta into noodles.

18. The apparatus according to claim 17, in which the twin-screw kneader comprises two screws rotating in the same direction and meshing with each other.

19. The apparatus according to claim 17, comprising, in addition, a gear pump connected between the outlet of the kneader and the die.

20. The apparatus according to claim 17, for the manufacture of oriental noodles, which further comprises longitudinal cutting means for receiving and longitudinally cutting the band of pasta from the laminating device, a braking device comprising a stop for forming streams of transverse undulation or loops of cut pasta, a device for treating the cut pasta streams with steam, followed by a device for folding the steamed pasta streams, a device for immersing the folded pasta streams in cold water, a device for deep frying of the pasta streams, and a device for drying the fried pasta streams by blowing air over the streams to form the oriental noodles.

* * * * *

UNITED STATES PATENT AND TRADEMARK OFFICE
CERTIFICATE OF CORRECTION

PATENT NO. : 5,840,359

DATED : November 24, 1998

INVENTORS : Jurg Lechthaler et al.

It is certified that error appears in the above-identified patent and that said Letters Patent is hereby corrected as shown below:

Column 9, line 57 (claim 4, line 2): change "0.1%" to --0.1-1%--.

Signed and Sealed this

Sixteenth Day of March, 1999

Attest:

Q. TODD DICKINSON

Attesting Officer     Acting Commissioner of Patents and Trademarks